E. M. MARTIN.
COMBINATION BOILER.
APPLICATION FILED APR. 18, 1917.
1,352,824.
Patented Sept. 14, 1920.
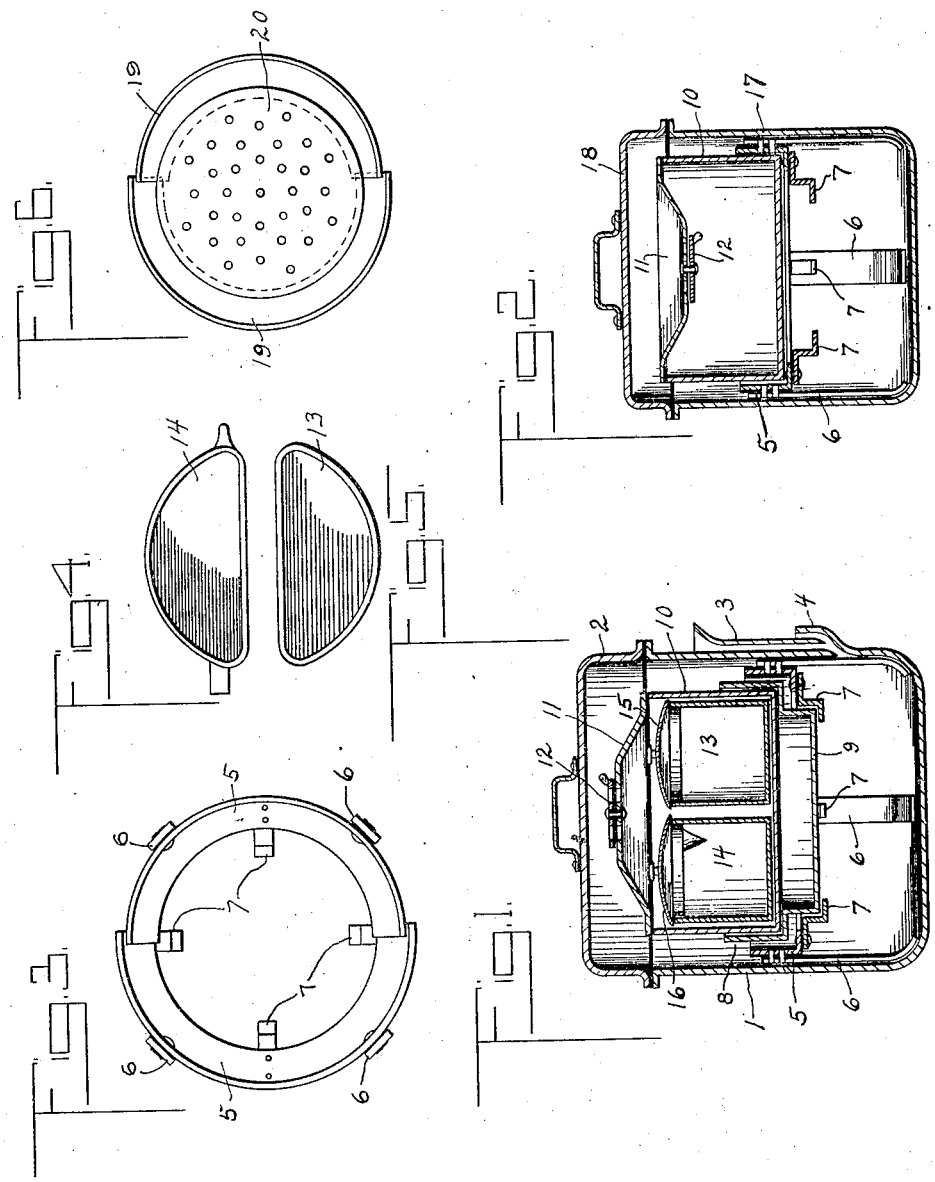
Witness
Frank W. Haskell
Chas. H. Woodbury
Inventor
Elizabeth M. Martin,
By Walter N. Haskell.
her Attorney

UNITED STATES PATENT OFFICE.

ELIZABETH M. MARTIN, OF STERLING, ILLINOIS.

COMBINATION-BOILER.

1,352,824.

Specification of Letters Patent. Patented Sept. 14, 1920.

Application filed April 18, 1917. Serial No. 162,824.

*To all whom it may concern:*

Be it known that I, ELIZABETH M. MARTIN, a citizen of the United States, residing at Sterling, in the county of Whiteside and State of Illinois, have invented certain new and useful Improvements in Combination-Boilers, of which the following is a specification.

My invention has reference to combination boilers, and has for its purpose to provide means whereby several articles can be cooked at the same time, with the use of a single burner. It is specially useful for camping parties, in summer cottages and the like, but is also of value in any place where it is desired to economize heat and space.

In the drawings, Figure 1 is a vertical medial section of a boiler embodying my invention, with some of the appurtenant parts therefor. Fig. 2 is a similar view of a boiler of smaller size, with some of the parts adapted thereto. Fig. 3 is a plan view of the support 5. Fig. 4 is a plan view of the receptacle 14 and Fig. 5 a similar view of the companion vessel 13 to be used therewith. Fig. 6 is a plan view of the rim 19.

Corresponding parts are indicated by similar reference numbers throughout the several figures.

1 represents a boiler of a common shape and size, provided with a cover 2. At one side of the boiler is a pipe 3 communicating with the inside of the boiler and by means of which such receptacle can be provided with a fresh supply of water. Near the lower end of the pipe 3 is a lip 4, in which the water is visible when the boiler is provided with a normal supply. When the water in the boiler falls below the opening from the pipe 3 into the same the issuance of steam through such pipe and the part 4 will indicate that the supply is becoming exhausted.

An annular support 5 is supported at a desired distance above the bottom of the kettle by means of legs 6 secured thereto at their upper ends, and having their lower ends bent inwardly to conform to the usual shape of the kettle. The support 5 is provided with a number of inwardly projecting brackets 7, upon which may be supported a dish 8, provided with a reduced bottom portion 9. The dish 8 is of such a size as to be spaced apart from the support 5, permitting the passage of the steam upwardly on all sides of such dish.

A receptacle 10 is adapted to be supported in the dish 8, a cover 11 being provided therefor, to which is rotatably secured a plate 12, having openings which are adapted to coincide with similar openings in the cover, which can be closed by rotating the disk. The receptacle 10 can be used separately, for holding food while being cooked, or it can be provided with a vessel 13, of semi-circular shape, provided with a lid 15, and a similarly shaped pot 14, having a lid 16, in which pot coffee or other beverages can be steeped while the rest of the dinner is cooking. The steam in the receptacle 10 can be permitted to escape through the openings in the cover 11, or it may be retained therein by closing the openings, as desired.

The support 5 is formed of two semi-circular parts, permitting an adjustment of such parts, so as to reduce the size of the opening in said support, and adapt the same to dishes of smaller diameter.

In Fig. 2 the receptacle 10 is shown seated directly on the support 5, and the cover 11 is inverted, forming a receptacle for eggs or similar articles which can be cooked in a shallow dish.

In Fig. 6 is shown a collapsible rim 19, provided with a central perforated plate 20. When used alone the rim 19 forms an auxiliary support for the part 5, being seated directly therein, in either the large or small sized boiler, the chief function thereof being to reduce the size of the central opening, so as to furnish a rest for the smaller dishes, such as the vessel 13. When used with the plate 20 the rim 19 provides a receptacle for vegetables or meat.

The vessel 13 is intended more specially for the preparation of oatmeal or other cereals. When used in conjunction with the other parts, as shown in Fig. 1, several compartments are provided in which a number of commodities can be cooked at the same time. Besides the spaces formed by the vessels 13 and 14, there is a space immediately below the same in the dish 8, and some kinds of vegetables can be cooked in the lower part of the boiler 1, in the water. By removing the covers 15 and 16 and inverting the cover 11, an additional receptacle is provided.

Many other combinations of the several parts can be made, which will be obvious to those who make use of the device. By the use thereof it is possible to provide a goodsized meal with the use of a single burner or blaze. It is of special value for camping parties, who are frequently provided with an oil-stove having one or two burners. Where two burners are usable, one can be utilized for the boiler outfit and the other for frying meat or other supplies. The various parts are also capable of being packed within a compact space for the purpose of transporting the same.

What I claim as my invention, and desire to secure by Letters Patent of the United States, is:

1. In a device of the class described, a boiler provided with a cover; an annular support provided with suitable legs, and formed of two parts adjustable with relation to each other; brackets attached to said support; and a vessel provided with a drop bottom adapted for support on said brackets, and spaced apart from said support.

2. In a device of the class described, the combination of a boiler provided with a cover; an annular support provided with suitable legs, and having inwardly projecting brackets at its lower edge; a dish adapted for support on said brackets and provided with an enlarged portion; and a receptacle supported in the enlarged portion of said dish, and provided with a cover.

In testimony whereof I affix my signature in the presence of two witnesses.

ELIZABETH M. MARTIN.

Witnesses:
W. N. HASKELL,
FRANK U. HASKELL.